United States Patent [19]

Mullan et al.

[11] 3,893,993

[45] July 8, 1975

[54] ALLERGENIC EXTRACTS CROSS LINKED UNDER ACID CONDITIONS WITH INORGANIC CYANATES

[75] Inventors: Noel Austin Mullan; Brian George Overell, both of Dorking, England

[73] Assignee: Beecham Group Limited, Great Britain

[22] Filed: July 20, 1973

[21] Appl. No.: 381,342

Related U.S. Application Data

[62] Division of Ser. No. 59,745, July 30, 1970, Pat. No. 3,794,630.

[30] Foreign Application Priority Data

Aug. 6, 1969 United Kingdom............... 39289/69
May 15, 1970 United Kingdom............... 23621/70
May 16, 1970 United Kingdom............... 23853/70

[52] U.S. Cl................................ 260/112 R; 424/91
[51] Int. Cl............................................... C07g 7/00
[58] Field of Search................... 260/112 R; 424/91

[56] References Cited

UNITED STATES PATENTS 2,816,099  12/1957  Young et al. ............... 260/112 R X

OTHER PUBLICATIONS

Journal of Biological Chemistry, Vol. 238, 1963, pp. 214–226, Stark et al.

Chem. Abstracts, Vol. 70, 1969 (effective date, 1967), 47862t, Stark.

*Primary Examiner*—Howard E. Schain

[57] ABSTRACT

Desensitizing or immunizing agents are provided for treating hypersensitive or allergic conditions. Modified allergenic material is prepared comprising an allergenic protein or glycoprotein crosslinked intermolecularly or intramolecularly with an inorganic cyanate. The modified material has reduced allergenicity relative to the uncrosslinked allergen and has the ability to produce antibodies having cross-specificity for the uncrosslinked allergenic protein or glycoprotein.

16 Claims, No Drawings

ALLERGENIC EXTRACTS CROSS LINKED UNDER ACID CONDITIONS WITH INORGANIC CYANATES

This is a divisional of our copending application Ser. No. 59,745, filed July 30, 1970, now U.S. Pat. No. 3,794,630.

The present invention relates to desensitizing or immunizing agents useful in the treatment of hypersensitive or allergic conditions, and to a method for their preparation.

It is well known that some individuals are allergic or hypersensitive to certain allergenic materials such as pollens, house dust, cat fur, cereals and a host of other common substances. Such individuals can suffer acute discomfort as a result of their allergic conditions which may manifest themselves in such diseases as asthma, hay fever, eczema, dermatitis and migraine. Consequently work continues to find suitable treatments which will alleviate the suffering of the allergic patient.

One technique which has been used in the past in the treatment of allergic conditions is the so-called "desensitization" therapy. The patient undergoing such therapy is administered repeated gradually increasing doses of an extract of the particular allergenic material or materials to which he is sensitive. At the end of a course of treatment the patient's natural resistance to the allergen is usually greatly enhanced, presumably as a result of the build-up of antibodies in his body, stimulated by the administered extract.

As will be appreciated, this desensitization therapy suffers from certain disadvantages, not the least of which lies in the possibilities that a dangerously high dose of allergen may inadvertently be administered, resulting in a general anaphylactic reaction in the patient. It has been suggested that this problem would be overcome if it were possible to modify the allergenic materials in such a way that their allergenicity is reduced relative to their desensitizing and/or immunizing properties. In other words, if the allergenic material could be rendered harmless, or at least less harmful to the sensitive patient, while at the time retaining its ability to stimulate antibody production, one of the main disadvantages of desensitization therapy could be removed.

According to the present invention there is provided a process for the preparation of a modified allergenic material, which process comprises the reaction of an allergenic material with a polyaldehyde, a polyketone, a carbodiimide, an epihalohydrin or an inorganic cyanate, with the proviso that when an inorganic cyanate is employed the reaction is carried out under acid conditions.

The allergenic starting material which is modified according to the process of this invention may be obtained from an allergen-containing substance such as pollen by extracting the allergen-containing substance with a suitable solvent, usually aqueous, in a known manner. The allergenic extract obtained in this way consists principally of protein or glycoprotein, usually contaminated with free carbohydrate. The allergenic extract is then usually purified by removing some of the contaminants, e.g., by dialysis, precipitation or gel filtration, and the resulting purified allergenic material may then be treated according to the process of this invention. A fuller description of some of the techniques available can be found in an article by J. N. Newell in the Journal of Allergy, Vol. 13, 1942, pages 177 to 203, particularly page 187. In another useful extraction procedure, the allergen-containing material or an aqueous extract thereof is treated with aqueous phenol and the allergenic extract is recovered from the phenol phase.

The polyaldehyde and polyketone reagents which lie within the scope of this invention include dialdehydes and diketones as well as the higher aldehydes and ketones. Generally of the polyketones and polyaldehydes which may be used we prefer to use dialdehydes, e.g., those having from 2 to about 24 carbon atoms in the molecule. The dialdehyde may be aliphatic, cycloaliphatic, heterocyclic or aromatic, and may have either a straight or branched chain structure, e.g., glyoxal, 1,3-propanedial, 1,4-butanedial, glutaraldehyde and α,ω-dialdehydes having from 14 to 24 carbon atoms in the molecule. A particularly preferred dialdehyde is glutaraldehyde.

The term "carbodiimide" as used in the present specification refers to compounds of formula (I) and salts thereof:

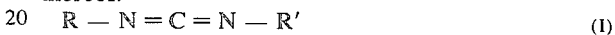

R — N = C = N — R'    (I)

wherein R and R' are the same or different and each is an aliphatic, aromatic or heterocyclic radical. The preferred carbodiimides for use in the present invention are watersoluble, e.g., 1-cyclohexyl-3-(2-morpholinoethyl) carbodiimide metho-p-toluenesulphonate.

As used herein the term "epihalohydrin" refers to compounds of formula (II):

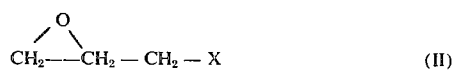

(II)

wherein X is a halogen atom, particularly bromine or chlorine. We find that good results are obtained with epichlorohydrin.

As examples of inorganic cyanate ion reagents may be mentioned the alkali metal cyanates, particularly potassium cyanate; and the alkaline earth metal cyanates.

As a general rule, allergenic proteins are fairly resistant to denaturation and can usually be heated to relatively high temperatures without denaturation taking place. The process of this invention can thus take place over a wide range of temperatures although in practice it will generally not be necessary or desirable to exceed a temperature of about 100°C. When dialdehydes are employed it is preferred to operate at a temperature below 37°C, and in practice we prefer to carry out the reaction at room temperature in each case, i.e., about 20° – 25°C. When employing dialdehydes, extreme reaction conditions should be avoided in order to reduce undesirable byproducts such as are produced by self condensation of the aldehydes.

In the case of polyaldehydes and polyketones, the pH at which the process of this invention should be carried out is not critical. A suitable pH range is from about 4 to about 8, with a pH of about 5 being preferred. Very low pH values should be avoided in order to reduce possible self condensation of the aldehydes.

Similarly in the case of epihalohydrin and carbodiimides, the reaction can be carried out at any convenient pH, although we prefer to avoid extremes of pH. For the epihalohydrin the reaction proceeds smoothly at alkaline pH's, suitably at about pH 8. In the case of the carbodiimide, the reaction is preferably carried out at acid pH's, suitably at pH about 5.

The reaction of the allergenic protein with an inorganic cyanate reagent in the process of this invention must be carried out at acid pH's preferably at a pH of about 5.

The reagents used in the process of this invention are believed to act as cross-linking agents for the allergenic material, forming inter- and/or intra-molecular links. Thus, although the allergenic starting materials are watersoluble, the modified allergenic products of the present invention are usually only sparingly soluble. The solubility of the modified allergenic materials appears to be dependent on the extent of cross-linking, which in turn may vary according to such factors as the nature and quantity of reagent used and the reaction conditions. We are not aware of any empirical method of determining in advance the solubility characteristics of the modified allergenic products and consequently the reaction variables necessary to obtain a product having the desired solubility must be determined by trial and error. This is a matter of routine, however, and should present little difficulty to those skilled in the art.

In another embodiment of this invention there is provided a pharmaceutical preparation comprising the modified allergenic material prepared by the process described above, and a parenterally acceptable carrier. Suitable carriers include isotonic salt or buffer solutions, oily carriers and other materials well known in the art. If desired an adjuvant such as tyrosine, alumina, aluminium hydroxide or aluminium phosphate, may be included.

The modified allergenic material is generally administered by subcutaneous injection. Dosage rates will vary according to the allergic condition of the patient.

Generally, in preparing pharmaceutical compositions in accordance with this invention, the modified allergenic material should be one which has a reduced solubility relative to the starting material, but which is sufficiently soluble in vivo to provide the desired release characteristics. We find that one way of achieving this is to use a sparingly soluble modified allergen absorbed on alumina and like materials. The degree of solubility of the cross-linked allergenic material is modified by absorption onto the alumina and the optimum in vivo release characteristics can be achieved by routine experimentation.

On parenteral administration to animals of the modified allergenic materials of this invention, it has been found that appreciable levels of circulating antibody are formed, the antibody having cross-specificity for the unmodified allergenic material. The modified materials tested did not cause any anaphylactic reaction in hypersensitive animals.

EXAMPLE 1

Preparation of Insoluble Allergen Derivative with Glutaraldehyde

A partially purified extract of Cocksfoot pollen, containing 10 mg. protein/ml in 0.1M sodium acetate buffer pH 5.3 (5 ml.), was treated with 0.5% glutaraldehyde solution (5 ml.), and stirred at room temperature for 30 minutes. The precipitate which formed was removed by centrifugation and washed with distilled water to remove residual soluble material. It was finally suspended in phenol-saline solution for storage.

Test of Allergenicity

The suspension of insolubilized pollen at a concentration of 10 mg/ml. was pricked into the skin of grass-sensitive allergic patients. At the same time the starting material and phenol-saline solution respectively were pricked into other areas of skin of the same patients. Weal areas were measured after 10 minutes, and are expressed in Table 1 in sq. mm. It can be seen that insolubilized material at 200 times the concentration of starting material has barely one tenth of its allergenicity: the retained allergenicity is thus negligible when compared with that of the starting material.

Test of Immunogenicity

The insolubilized material and the starting material respectively were emulsified in Freund's complete adjuvant to give concentrations of 1 mg/ml. Groups of guinea-pigs were injected subcutaneously with one or other of the emulsions (0.5 ml.). After 22 days the animals were clipped free of hair on the flanks and a series of intradermal injections (0.1 ml.) of a serial dilution of purified Cocksfoot pollen extract was made into the clipped areas. A 5% solution of Pontamine Sky Blue (0.4 ml.) was immediately injected intravenously. After 20 minutes weal diameters were measured, and are recorded in Table 2.

It can be seen that not only does the glutaraldehyde-treated material produce antibody which reacts with the starting material, but it is a more efficient immunizer than the starting material.

TABLE I

| Patient No. | Insolubilized Cocksfoot pollen extract 10 mg/ml. | Purified Cocksfoot extract 50 μg/ml | Phenol-Saline |
| --- | --- | --- | --- |
| 1 | 21 | 84 | 12 |
| 2 | 16 | 32 | 9 |
| 3 | 13 | 57 | 23 |
| 4 | 15 | 51 | 4 |
| Total | 65 | 224 | 48 |
| Total less that for phenol-saline. | 17 | 176 | — |

TABLE II

| Guinea Pig Number | Immunizing material (0.5 mg) | Weal diameter (mm.) for quantity of Cocksfoot pollen extract injected intradermally | | | | | |
| --- | --- | --- | --- | --- | --- | --- | --- |
| | | 100μg | 10μg | 1μg | 0.1μg | 0.01μg | 0.001μg |
| 1 | Purified Cocksfoot Pollen Extract | 15 | 0 | 0 | 0 | 0 | 0 |
| 2 | | 16 | 0 | 0 | 0 | 0 | 0 |
| 3 | | 17 | 0 | 0 | 0 | 0 | 0 |

TABLE II-Continued

| Guinea Pig Number | Immunizing material (0.5 mg) | Weal diameter (mm.) for quantity of Cocksfoot pollen extract injected intradermally | | | | | |
|---|---|---|---|---|---|---|---|
| | | 100 μg | 10 μg | 1 μg | 0.1 μg | 0.01 μg | 0.001 μg |
| 4 | | 16 | 0 | 0 | 0 | 0 | 0 |
| 5 | Glutaraldehyde- | 14 | 0 | 0 | 0 | 0 | 0 |
| 6 | treated Cocksfoot | 12 | 10 | 9 | 0 | 0 | 0 |
| 7 | Pollen Extract | 14 | 13 | 12 | 12 | 10 | 8 |
| 8 | | 16 | 14 | 12 | 11 | 10 | 8 |
| 9 | | 12 | 10 | 0 | 0 | 0 | 0 |
| 10 | | 12 | 9 | 0 | 0 | 0 | 0 |

EXAMPLE 2

Preparation of Carbodiimide-Treated Allergen

Fifty mg of material which had been extracted from mixed grass pollens, and which had been partially purified by treatment with aqueous phenol and subsequent precipitation of protein from the phenol phase, so as to remove much of the carbohydrate and low molecular weight material, was dissolved in 5 ml. of 0.5 M. borate buffer, pH 8.85. 5 ml of a 2% solution of 1-cyclohexyl-3-(2-morpholinoethyl) carbodiimide metho-p-toluenesulphonate was added slowly, and the solution was stirred at room temperature overnight. The precipitate which formed was then centrifuged off, washed three times with borate buffer, and suspended in phenol saline.

TEST OF ALLERGENICITY

A suspension of the test material and a solution of the starting material, both in phenol-saline, and the medium itself, were respectively pricked into the skin of grass sensitive allergic patients. Weal areas were measured after 10 minutes.

The results of the allergenicity test are shown in Table III:

TABLE III

| Patient No. | Mixed grass pollen extract 50 μg/ml | Carbodimide-treated mixed grass pollen extract | Phenol saline |
|---|---|---|---|
| 1 | 12 | 0 | 0 |
| 2 | 3 | 2 | 0 |
| 3 | 8 | 0 | 0 |
| 4 | 12 | 0 | 0 |
| 5 | 15 | 0 | 0 |
| 6 | 62 | 3 | 0 |
| Total | 112 | 5 | 0 |

Figures indicate weal areas (sq.mm.).

TEST OF IMMUNOGENICITY

Replicate guinea pigs were immunized by subcutaneous injection of an emulsion containing the test material in Freund's complete adjuvant. A similar set of guinea pigs were immunized with the unmodified starting material adjuvanted in the same way. After 21-8 days the animals wer clipped free of hair on the flanks and a series of intradermal injections (0.1 ml.) of a serial dilution of starting material terminating with normal saline was made into the clipped area.

A 5% solution of Pontamine Sky Blue (0.4 ml) was immediately injected intravenously. After 20 minutes blue-colored weals formed at some of the sites of intradermal injection, indicating the presence of antibody with specificity for the starting material. Weal diameters were measured and recorded.

The results of the immunogenicity tests are recorded in Table IV:

TABLE IV

| Guinea Pig No. | Immunizing Material 5 mg | Weal diameter (MMs) for quantity of mixed grass pollen extract injected intradermally | | | | | |
|---|---|---|---|---|---|---|---|
| | | 100 μg | 10 μg | 1 μg | 0.1 μg | 0.01 μg | 0.001 μg |
| 1 | mixed | 14 | 12 | 10 | 9 | 8 | 8 |
| 2 | grass pol- | 14 | 13 | 10 | 9 | 8 | — |
| 3 | len ex- | 16 | 14 | 12 | 10 | 9 | 9 |
| 4 | tract | 14 | 13 | 10 | — | — | — |
| 5 | carbodiimide- | 14 | 12 | 10 | 10 | 9 | — |
| 6 | treated mixed | 12 | 10 | — | — | — | — |
| 7 | grass pollen | 12 | 10 | 9 | 9 | 9 | — |
| 8 | extract | — | — | — | — | — | — |

It can be seen from the results shown in Tables III and IV that higher levels of antibody were produced by immunization with the carbodiimide modified allergen, but that the allergenicity of the material was negligible.

EXAMPLE 3

50 mg of material which had been extracted from mixed grass pollens, and which had been partially purified so as to remove much of the carbohydrate and low molecular weight material, was dissolved in 5 ml of 0.01 M phosphate buffer pH 8.0. 1 ml of 1-chloro-2:3-epoxypropane was added slowly and the mixture was stirred overnight at room temperature. The precipitate which formed was centrifuged off, washed with phosphate buffer, and suspended in phenol saline.

TEST OF ALLERGENICITY

A suspension of the test material and a solution of the starting material, both in phenol-saline, and the medium itself, were respectively pricked into the skin of grass sensitive allergic patients. Weal areas were measured after 10 minutes. The results of the test of allergenicity are shown in Table V:

TABLE V

| Patient No. | Mixed grass pollen extract (50 μg/ml) | Epichlorhydrin-treated mixed grass pollen extract (1 mg/ml) | Phenol saline |
|---|---|---|---|
| 1 | 62 | 0 | 0 |
| 2 | 15 | 1 | 0 |
| 3 | 12 | 0 | 0 |
| 4 | 8 | 2 | 0 |
| 5 | 3 | 0 | 0 |
| 6 | 12 | 0 | 0 |
| Total | 112 | 3 | 0 |

Figures indicate weal areas (sq.mm.).

TEST OF IMMUNOGENICITY

Replicate guinea pigs were immunized by subcutaneous injection of an emulsion containing the test material in Freund's complete adjuvant. A similar set of guinea pigs were immunized with the unmodified starting material adjuvanted in the same way. After 21-8 days the animals were clipped free of hair on the flanks and a series of intradermal injections (0.1 ml) of a serial dilution of starting material terminating with normal saline was made into the clipped area.

A 5% solution of Pontamine Blue Sky (0.4 ml) was immediately injected intravenously. After 20 minutes blue-colored weals formed at some of the sites of intradermal injection, indicating the presence of antibody with specificity for the starting material. Weal diameters were measured and recorded. The results of the test of immunogenicity are shown in Table VI:

TABLE VI

| Guinea Pig No. | Immunizing material | Weal diameter (mms) for quantity of mixed grass pollen extract injected i.d. | | | | | |
|---|---|---|---|---|---|---|---|
| | | 100 µg | 10 µg | 1 µg | 0.1 µg | 0.01 µg | 0.001 µg |
| 1 | mixed grass | 14 | 13 | 10 | — | — | — |
| 2 | pollen ex- | 16 | 14 | 12 | 10 | 9 | 9 |
| 3 | tract | 14 | 13 | 10 | 9 | 8 | — |
| 4 | (5 mg) | 14 | 12 | 10 | 9 | 8 | 8 |
| 5 | Epichlorhy- | 12 | 10 | — | — | — | — |
| 6 | drin-treated | 10 | — | — | — | — | — |
| 7 | mixed grass | — | — | — | — | — | — |
| 8 | pollen extract (5 mg) | 10 | — | — | — | — | — |
| 9 | mixed grass | 12 | 9 | — | — | — | — |
| 10 | pollen ex- | 14 | 12 | 9 | — | — | — |
| 11 | tract | 12 | 11 | 9 | — | — | — |
| 12 | (0.5 mg) | 14 | 12 | 9 | — | — | — |
| 13 | Epichlorhy- | 10 | 8 | — | — | — | — |
| 14 | drin-treated | — | — | — | — | — | — |
| 15 | grass pollen | 10 | 8 | — | — | — | — |
| 16 | extract (0.5 mg) | — | — | — | — | — | — |

It can be seen from the above results that detectable levels of antibody were produced by immunization with epichlorhydrin-treated allergens while the allergenicity was reduced to a negligible level.

EXAMPLE 4

50 mg of material which had been extracted from Cocksfoot grass pollen was dissolved in 10 ml of 0.01 M pH 8.0. 1 ml of 1-bromo-2:3-epoxypropane was added slowly and the mixture was stirred overnight at room temperature. The precipitate which formed was centrifuged off, washed with phosphate buffer, and suspended in phenol saline.

Results of the biological testing are shown in Tables III and IV. The testing procedures were identical with those of Example 3. Detectable levels of antibody were produced by immunization, while allergenicity was reduced to negligible levels.

TABLE VIII

| Patient No. | Allergenicity of Epibromohydrin-Treated Allergen | | Phenol saline |
|---|---|---|---|
| | Cocksfoot extract 100 µg/ml | Epibromohydrin-treated Cocksfoot pollen extract 100 µg/ml | |
| 1 | 9 | 0 | 0 |
| 2 | 18 | 0 | 0 |
| 3 | 22 | 0 | 0 |
| 4 | 21 | 0 | 0 |
| Total | 70 | 0 | 0 |

EXAMPLE 5

PREPARATION OF CYANATE - MODIFIED ALLERGEN

An aqueous extract of mixed grass pollens (Bent, Broom, Cocksfoot, Dogstail, False Oat, Fescue, Foxtail, Meadow Rye, Timothy Vernal and Yorkshire Fog) was partially purified by treatment with aqueous phenol followed by precipitation of protein from the phenol phase to remove much of the carbohydrate and the low molecular weight materials. 50 mg of the resultant partially purified allergenic protein was dissolved in 5 ml of water and the pH adjusted to pH 8 by the addition of sodium hydroxide solution. The pH was then further adjusted 5.0 with acetic acid, 0.2 g of potassium cyanate was added, and the mixture stirred at room temperature overnight. The precipitate which formed was washed repeatedly with phosphate buffer at pH 8 and then suspended in phenol saline.

TEST OF ALLERGENICITY

A suspension of the cyanate-modified allergen prepared as above, a suspension of the unmodified par-

TABLE VII

| | Immunogenicity of Epibromohydrin-Treated Allergen | | | | | |
|---|---|---|---|---|---|---|
| Guinea Pig No. | Immunizing material | Weal diameter (mm) for quantity of cocksfoot pollen extract injected i.d. | | | | |
| | | 100µg | 10µg | 1µg | 0.1µg | 0.01µg | 0.001µg |
| 1 | Cocksfoot | 16 | 10 | — | — | — | — |
| 2 | pollen ex- | 16 | 10 | — | — | — | — |
| 3 | tract (0.5 mg) | 16 | 10 | — | — | — | — |
| 4 | Epibromohydrin | 14 | 10 | — | — | — | — |
| 5 | treated Cocks- | 14 | 10 | — | — | — | — |
| 6 | foot extract (0.5 mg) | 15 | 10 | — | — | — | — | tially purified allergen extract (both in phenol saline) and the phenolsaline medium itself were respectively pricked into the skin of grass-sensitive allergic patients. Weal areas were measured after ten minutes and are expressed in Table IX in sq. mm. It can be seen that the cyanate modified allergen exhibits negligible allergenicity relative to the unmodified material.

TABLE IX

| Patient No. | Mixed grass pollen extract 50 µg/ml | Cyanate-treated mixed grass pollen extract 1 mg/ml | Phenol saline |
| --- | --- | --- | --- |
| 1 | 12 | 4 | 0 |
| 2 | 3 | 2 | 0 |
| 3 | 8 | 6 | 0 |
| 4 | 12 | 3 | 0 |
| 5 | 15 | 5 | 0 |
| 6 | 62 | 24 | 0 |
| Total | 112 | 44 | 0 |

TEST OF IMMUNOGENICITY

Replicate guinea pigs were immunized by subcutaneous injection of an emulsion containing the cyanate-modified allergen in Freund's complete adjuvant. A similar set of guinea pigs were immunized with the unmodified starting material adjuvanted in the same way. After 21–28 days both sets of animals were clipped free of hair on the flanks and a series of intradermal injections (0.1 ml) of a serial solution of the starting material terminating with normal saline was made into the clipped area.

A 5% solution of Pontamine skyblue (0.4 ml) was immediately injected intravenously. After 20 minutes bluecolored weals formed and some of the sites of intradermal injection, indicating the presence of antibody with specificity for the starting material. Again weal diameters were measured and are recorded in Table X. It can be seen that the cyanate modified allergen retains the immunizing specificity of the starting material.

TABLE X

| Guinea Pig. No. | Immunizing material | Weal diameter (mms) for quantity of mixed grass pollen extract injected i.d. | | | | | |
| --- | --- | --- | --- | --- | --- | --- | --- |
| | | 100µg | 10µg | 1µg | 0.1µg | 0.01µg | 0.001µg |
| 1 | Mixed grass | 14 | 12 | 10 | 9 | 8 | 8 |
| 2 | pollen extract | 14 | 13 | 10 | 9 | 8 | — |
| 3 | (5 mg) | 16 | 14 | 12 | 10 | 9 | 9 |
| 4 | | 14 | 13 | 10 | — | — | — |
| 5 | Cyanate-treated | 12 | 9 | 7 | — | — | — |
| 6 | mixed grass | 12 | 9 | 7 | — | — | — |
| 7 | pollen extract | 10 | — | — | — | — | — |
| 8 | (5 mg) | 12 | — | — | — | — | — |
| 9 | Mixed grass | 14 | 12 | 9 | — | — | — |
| 10 | pollen extract | 12 | 11 | 9 | — | — | — |
| 11 | (0.5 mg) | 14 | 12 | 9 | — | — | — |
| 12 | | 12 | 9 | — | — | — | — |

EXAMPLE 6

In order to obtain confirmation of the biological testing results the procedure of Example 5 was repeated. The results of the test of the allergenicity of the modified allergen are recorded in Table XI and the results of the tests of the immunogenicity of the cyanate-modified allergen are recorded in Table XII.

TABLE XI

| Patient No. | Mixed grass pollen extract 100 µg/ml | Cyanate-treated mixed grass pollen extract 2 mg/ml | Phenol saline |
| --- | --- | --- | --- |
| 1 | 23 | 1 | 1 |
| 2 | 6 | 0 | 0 |
| 3 | 2 | 0 | 0 |
| 4 | 19 | 0 | 0 |
| Total | 50 | 1 | 1 |

Figures indicate weal areas (sq.mm.).

TABLE XII

| Guinea Pig No. | Immunizing material | Weal diameter (mms) for quantity of mixed grass pollen extract injected i.d. | | | | | |
| --- | --- | --- | --- | --- | --- | --- | --- |
| | | 100µg | 10µg | 1µg | 0.1µg | 0.01µg | 0.001µg |
| 1 | Mixed grass | 12 | 10 | 9 | 8 | — | — |
| 2 | pollen extract | 12 | 10 | 7 | — | — | — |
| 3 | (5 mg) | 12 | 10 | 8 | — | — | — |
| 4 | | 12 | 10 | 9 | — | — | — |
| 5 | Cyanate-treated | 12 | 10 | — | — | — | — |
| 6 | mixed grass | 12 | 9 | — | — | — | — |
| 7 | pollen extract | 14 | 12 | 9 | — | — | — |
| 8 | (5 mg) | 14 | 10 | — | — | — | — |
| 9 | Mixed grass | 14 | 10 | — | — | — | — |
| 10 | pollen extract | 12 | 11 | 9 | — | — | — |
| 11 | (0.5 mg) | 10 | 9 | — | — | — | — |
| 12 | | — | — | — | — | — | — |
| 13 | Cyanate-treated | 12 | 11 | 8 | — | — | — |
| 14 | mixed grass | 12 | — | — | — | — | — |
| 15 | pollen extract | 10 | — | — | — | — | — |
| 16 | (0.5 mg) | — | — | — | — | — | — |

EXAMPLE 7

TREATMENT OF POLLEN EXTRACT WITH PHENYL GLYOXAL METHOD

A 3% solution of phenylglyoxal hydrate dissolved in 0.01 M phosphate buffer, pH 8, was added to an equal volume of 50 mg of material which had been extracted from cocksfoot pollen and which, after purification by treatment with phenol, was dissolved in the same buffer. The reaction was carried out at room temperature for 24 hours. The precipitate which formed was washed repeatedly with phosphate buffer at pH 8 and then suspended in phenol saline.

TEST OF ALLERGENICITY

A suspension of the phenylglyoxal-modified material prepared as above, a suspension of the unmodified phenol treated Cocksfoot extract (both in phenol-saline) and the phenol-saline medium itself were respectively pricked into the skin of grass-sensitive allergic patients. Weal areas were measured after ten minutes and are expressed in Table XIII in sq.mm.

TABLE XIII

| Patient No. | Cocksfoot pollen extract 50 μg/ml | Phenylglyoxyal-treated extract 1 mg/ml | Phenol Saline |
| --- | --- | --- | --- |
| 1 | 35 | 0 | 0 |
| 2 | 27 | 4 | 0 |
| 3 | 19 | 2 | 1 |
| Total | 91 | 6 | 1 |

TEST OF IMMUNOGENICITY

Replicate guinea pigs were immunized by subcutaneous injection of an emulsion containing the phenylglyoxal modified material in Freud's complete adjuvant. A similar set of guinea pigs were immunized with the unmodified starting material adjuvanted in the same way. After 28 days, both sets of animals were clipped free of hair on the flanks and a series of intradermal injections (0.1 ml) of a serial solution of the starting material terminating with normal saline was made into the clipped area. A 5% solution of Pontamine sky blue (0.4 ml) was immediately injected intravenously. After 20 minutes blue colored weals formed at some of the sites of intradermal injection, indicating the presence of antibody with specificity for the starting material. Weal areas were measured and are recorded in Table XIV.

TABLE XIV

| Guinea Pig No. | Immunizing Material | Weal diameter (mm) for quantity of Cocksfoot pollen extract injected i.d. | | | | | |
| --- | --- | --- | --- | --- | --- | --- | --- |
| | | 100μg | 10μg | 1μg | 0.1μg | 0.01μg | 0.001μg |
| 1 | Cocksfoot | 14 | 14 | 10 | 10 | 9 | 7 |
| 2 | pollen | 14 | 12 | 8 | 7 | 6 | — |
| 3 | extract | 12 | 11 | 10 | 9 | 7 | — |
| 4 | (5 mg) | 12 | 11 | 9 | 9 | 8 | — |
| 1 | Phenylglyoxal | 12 | 11 | — | — | — | — |
| 2 | treated cocks- | 13 | 10 | — | — | — | — |
| 3 | foot pollen | 12 | — | — | — | — | — |
| 4 | extract(0.5mg) | — | — | — | — | — | — |

TABLE XV

| Patient No. | Cocksfoot pollen extract 50 μg/ml | Nitroindanedione treated extract 1 mg/ml | Phenol saline |
| --- | --- | --- | --- |
| 1 | 3 | 0 | 0 |
| 2 | 11 | 2 | 1 |
| 3 | 8 | 2 | 0 |
| 4 | 5 | 1 | 0 |
| Total | 27 | 5 | 1 |

TEST OF IMMUNOGENICITY

Replicate guinea pigs were immunised by subcutaneous injection of an emulsion containing the nitroindanedione modified material in Freud's complete adjuvant. A similar set of guinea pigs were immunised with the unmodified starting material adjuvanted in the same way. After 28 days, both sets of animals were clipped free of hair on the flanks and a series of intradermal injections (0.1 ml) of a serial solution of the starting material terminating with normal saline was made into the clipped area. A 5% solution of Pontamine sky blue (0.4 ml) was immediately injected intravenously. After 20 minutes the weals were measured and recorded in Table XVI.

TABLE XVI

| Guinea Pig No. | Immunizing Material | Weal diameter (mm) for quantity of cocksfoot extract injected intradermally | | | | | |
| --- | --- | --- | --- | --- | --- | --- | --- |
| | | 100μg | 10μg | 1μg | 0.1μg | 0.01μg | 0.001μg |
| 1 | Cocksfoot | 13 | 13 | 9 | 9 | — | — |
| 2 | pollen | 13 | 13 | 5 | 4 | 3 | — |
| 3 | extract | 12 | 11 | 10 | 9 | 7 | — |
| 4 | (0.5 mg) | 12 | 11 | 9 | 9 | 8 | — |
| 1 | Nitroin- | 10 | — | — | — | — | — |
| 2 | danedione | 14 | 11 | — | — | — | — |
| 3 | treated | 14 | 11 | — | — | — | — |
| 4 | cocksfoot pollen extract (0.5 mg) | 9 | — | — | — | — | — |

EXAMPLE 8

TREATMENT OF POLLEN EXTRACT WITH GLUTARALDEHYDE AND SUBSEQUENT ABSORPTION INTO ALUMINIUM HYDROXIDE

METHOD 1 ml of 5% of glutaraldehyde solution was added to 9ml of an aqueous extract of timothy pollen containing 1 mg/ml at pH 5.3. The mixture was stirred at room temperature for 3 days. 6 ml of 2% aluminium hydroxide solution were added and the mixture stirred for one hour. After centrifugation the precipitate was washed twice in 0.01 M phosphate buffer pH 8 and three times in distilled water and finally resuspended to a concentration of 1 mg/ml pollen in phenol saline. The procedure was repeated without the addition of glutaraldehyde, the final suspension serving as a control in the immunizing specificity test.

TEST OF IMMUNIZING SPECIFICITY

Replicate guinea pigs were immunized by subcutaneous injection of the alumina-glutaraldehyde adsorbed modified material. A similar set of guinea pigs were immunized with unmodified alumina-adsorbed timothy pollen extract at a pollen concentration of 1 mg/ml. 21 days later a repeat injection was given and the animals bled 10 days later.

Passive cutaneous anaphylaxis was carried out on the sera by injection of serial dilutions intradermally into a clipped area on the flanks of a set of guinea pigs. The pigs were then challenged intravenously with the unmodified aqueous timothy extract, containing 0.4 ml Pontamine sky blue solution, five hours later. Results obtained with different concentrations of challenging antigen are shown in Table XVIII for the modified material and Table XIX for the control suspension without glutaraldehyde.

TABLE XVI

| Guinea Pig No. | Challenge Freeze-dried aqueous Timothy pollen extract | Weal diameters in mm at serum dilution of | | | | | |
|---|---|---|---|---|---|---|---|
| | | $\frac{1}{5}$ | $\frac{1}{25}$ | $\frac{1}{125}$ | $\frac{1}{625}$ | $\frac{1}{3125}$ | saline |
| 1 | 1 mg/ml | 22 | 20 | 16 | 10 | — | — |
| 2 | 100 µg/ml | 20 | 17 | 13 | — | — | — |
| 3 | 10 µg/ml | 20 | 18 | — | — | — | — |
| 4 | 5 µg/ml | 14 | — | — | — | — | — |

TABLE XVII

| Guinea Pig No. | Challenge Freeze-dried aqueous Timothy pollen extract | Weal diameters in mm at serum dilution of | | | | | |
|---|---|---|---|---|---|---|---|
| | | $\frac{1}{5}$ | $\frac{1}{25}$ | $\frac{1}{125}$ | $\frac{1}{625}$ | $\frac{1}{3125}$ | saline |
| 5 | 1 mg/ml | 25 | 16 | — | — | — | — |
| 6 | 100 µg/ml | 20 | 18 | 16 | — | — | — |
| 7 | 10 µg/ml | — | — | — | — | — | — |
| 8 | 5 µg/ml | — | — | — | — | — | — |

TEST OF ALLERGENICITY

A suspension of the above material, a solution of the unmodified pollen extract (both in phenol-saline) and the phenol saline medium itself were respectively pricked into the skin of grass-sensitive allergic patients. Weal areas were measured after 10 minutes and are expressed in Table XVII in sq.mm.

TABLE XV

| Patient No. | Timothy pollen aqueous extract 50 µg/ml | Alumina adsorbed glutaraldehyde treated Timothy pollen extract 1 mg/ml | Alumina adsorbed untreated Timothy pollen extract 1 mg/ml | Phenol saline |
|---|---|---|---|---|
| 1 | 17 | 2 | 6 | 0 |
| 2 | 2 | 0 | 3 | 0 |
| 3 | 6 | 0 | 3 | 0 |
| Total | 25 | 2 | 12 | 0 |

It can be seen that treatment with glutaraldehyde leads to enhanced antibody formation when compared with that from untreated material, although allergenic activity was reduced.

We claim:

1. A process for the preparation of a modified allergenic material which comprises an allergenic extract of pollen or house dust which consists principally of a protein or glycoprotein, which allergenic extract is cross-linked under acidic conditions inter- or intramolecularly with an inorganic cyanate, said modified allergenic material being substantially water-insoluble or only sparingly water-soluble and having a reduced allergenicity relative to the uncrosslinked protein or glycoprotein and having the ability to stimulate the production of antibodies having cross-specificity for the unlinked protein or glycoprotein, which comprises reacting an allergenic extract of a pollen extract selected from the group consisting of Cocksfoot pollen, mixed grass pollens and timothy pollen or house dust with an inorganic cyanate at an acidic pH to reduce the allergenicity and recovering the modified allergenic material so produced.

2. A process according to claim 1 wherein the temperature is below 100° C.

3. A process according to claim 1 wherein the pH is about 5.

4. A process according to claim 2 wherein the temperature is about room temperature.

5. A process according to claim 1 wherein the inorganic cyanate is an alkali metal cyanate or an alkaline earth metal cyanate.

6. A process according to claim 1 wherein the inorganic cyanate is potassium cyanate.

7. A process according to claim 1 wherein the allergenic extract is a pollen extract.

8. A process according to claim 1 wherein the allergenic extract is a house dust extract.

9. A modified allergenic material which comprises an allergenic extract of pollen or house dust which consists principally of a protein or glycoprotein, which allergenic extract is crosslinked under acidic conditions inter- or intramolecularly with an inorganic cyanate, said modified allergenic material being substantially water-insoluble or only sparingly water-soluble and having a reduced allergenicity relative to the uncrosslinked protein or glycoprotein and having the ability to stimulate the production of antibodies having cross-specificity for the unlinked protein or glycoprotein.

10. A modified allergenic material according to claim 9 wherein the allergenic extract is a pollen extract.

11. A modified allergenic material according to claim 9 wherein the allergenic extract is a house dust extract.

12. A modified allergenic material according to claim 9 wherein the inorganic cyanate is an alkali metal cyanate or an alkaline earth metal cyanate.

13. A modified allergenic material according to claim 9 wherein the inorganic cyanate is potassium cyanate.

14. A modified allergenic material according to claim 10 wherein the pollen is Cocksfoot pollen.

15. A modified allergenic material according to claim 10 wherein the pollen is mixed grass pollens.

16. A modified allergenic material according to claim 10 wherein the pollen is timothy pollen.

* * * * *